(12) United States Patent
Tamjidi et al.

(10) Patent No.: US 11,720,532 B2
(45) Date of Patent: *Aug. 8, 2023

(54) SYSTEM AND METHOD FOR CUSTOMIZED GRAPHQL DATA-HANDLING SCRIPTS

(71) Applicant: ServiceNow, Inc., Santa Clara, CA (US)

(72) Inventors: David Tamjidi, San Diego, CA (US); Stuart Dean Swope, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,867

(22) Filed: Dec. 6, 2021

(65) Prior Publication Data

US 2022/0092038 A1 Mar. 24, 2022

Related U.S. Application Data

(63) Continuation of application No. 16/784,007, filed on Feb. 6, 2020, now Pat. No. 11,263,186.

(51) Int. Cl.
*G06F 16/21* (2019.01)
*G06F 9/54* (2006.01)
*G06F 16/242* (2019.01)
*G06F 16/22* (2019.01)

(52) U.S. Cl.
CPC ............ *G06F 16/211* (2019.01); *G06F 9/547* (2013.01); *G06F 16/2282* (2019.01); *G06F 16/2433* (2019.01)

(58) Field of Classification Search
CPC .. G06F 16/9024; G06F 16/211; G06F 16/212; G06F 16/248; G06F 16/245
USPC ......................................................... 707/803
See application file for complete search history.

(56) References Cited

U.S. PATENT DOCUMENTS

| 6,321,229 | B1 | 11/2001 | Goldman |
| 7,020,706 | B2 | 3/2006 | Cates |
| 7,716,353 | B2 | 5/2010 | Golovinsky |
| 7,769,718 | B2 | 8/2010 | Murley |
| 7,925,981 | B2 | 4/2011 | Pourheidar |
| 8,151,261 | B2 | 4/2012 | Sirota |

(Continued)

*Primary Examiner* — Hung T Vy
(74) *Attorney, Agent, or Firm* — Fletcher Yoder PC

(57) ABSTRACT

The present disclosure is directed to a modified GraphQL server that enables application developers to define custom GraphQL schema fragments. For example, a developer may provide the GraphQL server with a GraphQL standard definition language (SDL) file having annotations that indicate that a customized data-handling script, such as a custom data-fetching script or a custom type resolver script, be called for handling certain data types or fields. These customized data-handling scripts are resolved and called at runtime based on the annotations in the GraphQL SDL file. By enabling developers to define schema fragments in the SDL language and implement data-handling scripts in a suitable scripting language, schema portability can be maintained across client instances, as well as instance release versions. Additionally, the disclosed approach enables enhanced modularity and reuse of previously defined data types and data-handling scripts, which increases developer productivity and reduces errors during application development.

20 Claims, 7 Drawing Sheets

(56) References Cited

U.S. PATENT DOCUMENTS

| | | |
|---|---|---|
| 8,402,127 B2 | 3/2013 | Solin |
| 8,612,408 B2 | 12/2013 | Trinon |
| 8,646,093 B2 | 2/2014 | Myers |
| 8,832,652 B2 | 9/2014 | Mueller |
| 9,065,783 B2 | 6/2015 | Ding |
| 9,098,322 B2 | 8/2015 | Apte |
| 9,122,552 B2 | 9/2015 | Whitney |
| 9,317,327 B2 | 4/2016 | Apte |
| 9,363,252 B2 | 6/2016 | Mueller |
| 9,535,737 B2 | 1/2017 | Joy |
| 9,645,833 B2 | 5/2017 | Mueller |
| 9,654,833 B2 | 5/2017 | Mueller |
| 9,766,935 B2 | 9/2017 | Kelkar |
| 9,805,322 B2 | 10/2017 | Kelkar |
| 10,521,195 B1 | 12/2019 | Swope et al. |
| 11,032,213 B1 * | 6/2021 | Hussain ............... H04L 67/1012 |
| 2019/0196789 A1 | 6/2019 | Bucchi et al. |
| 2019/0196890 A1 * | 6/2019 | Bucchi ............... G06F 16/24545 |
| 2019/0332451 A1 | 10/2019 | Tamjidi et al. |
| 2019/0340287 A1 | 11/2019 | Tamjidi et al. |
| 2020/0089478 A1 | 3/2020 | Nelson et al. |
| 2020/0341994 A1 | 10/2020 | Tamjidi et al. |
| 2020/0389543 A1 | 12/2020 | Swope et al. |
| 2021/0173888 A1 * | 6/2021 | Flack ................ G06F 16/24539 |

* cited by examiner

```
type   GlideMovie_QueryType   {
  hero(String: name):   Character   {@DataFetcher(id: "heroFetcher")}
} interface Character {@TypeResolver(id: "characterTypeResolver")} {
  id: ID!
  name: String!
} type Human implements Character {
  id: ID!
  name: String! {@DataFetcher(id: "humanNameFetcher")}
} type Robot implements Character {
  id: ID!
  name: String!
}
```

SYSTEM AND METHOD FOR CUSTOMIZED GRAPHQL DATA-HANDLING SCRIPTS

CROSS-REFERENCE TO RELATED APPLICATION

This application is a continuation of U.S. patent application Ser. No. 16/784,007, filed Feb. 6, 2020, and entitled, "SYSTEM AND METHOD FOR CUSTOMIZED GRAPHQL DATA-HANDLING SCRIPTS," which is incorporated by reference herein in its entirety for all purposes.

BACKGROUND

The present disclosure relates generally to GraphQL, and more specifically, to implementing custom data-handling scripts in a modified GraphQL system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Cloud computing platforms often include databases and support one or more data access technologies. For example, certain cloud computing platforms may support GraphQL, which is a publicly released query language that has been available since 2015. See, e.g., https://graphql.org/. Compared to other query languages, GraphQL is hierarchical and generally enables queries to have greater specificity, which can substantially reduce overhead involving querying and transferring superfluous or undesired data. Additionally, GraphQL is a strongly typed query language, which enables developers to clearly define the data types for fields of a query.

However, the standard GraphQL implementation has limitations. For example, in a standard GraphQL implementation, if an application developer wants to define a custom GraphQL function, then the developer would first create the function in a suitable programming language, then the function would undergo validation, testing, and approval. Generally, the function is compiled and, in most cases, immutable once loaded. Finally, the function would eventually be added to the GraphQL server as a patch or upgrade. As such, the developer would be required to be familiar with a compiled programming language to define the function, and there would be considerable delay before the function would be available for use.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

It is presently recognized that there is a need for improved flexibility in developer skills, as well as reduced delay in implementing developer features and customizations, within a GraphQL framework. With this in mind, present embodiments are directed to a modified or "scripted" GraphQL server that enables application developers to define customs GraphQL schema fragments that are added to an overall GraphQL schema of a client instance "on the fly," without having to recompile code or wait for the next patch/upgrade of the client instance. For example, a developer may provide the disclosed GraphQL server with a GraphQL standard definition language (SDL) file that defines a partial GraphQL schema, including particular fields, data types, and so forth. Additionally, the GraphQL SDL file may include annotations that indicate that a customized data-handling script, such as a custom data-fetching script or a custom type resolver script, be called for handling certain data types or fields. Since these customized data-handling scripts are resolved and called at runtime based on the annotations in the GraphQL SDL file, each of these scripts can be customized and immediately implemented (e.g., "on the fly", without a server restart). The GraphQL SDL file and the customized data-handling scripts may be stored in one or more suitable database tables, and the GraphQL server may be configured to regenerate the GraphQL schema in response to detecting a change in the data stored by these tables. Additionally, the customized data-handling scripts can be cached for enhanced efficiency, and the cache may be flushed and reloaded in response to changes to one or more of the database tables.

By enabling developers to define partial schemas in the GraphQL SDL language and implement GraphQL data-handling scripts in a suitable scripting language, GraphQL schema portability can be maintained across client instances, as well as instance release versions. Additionally, the disclosed GraphQL server enables auto-generation of templates or shells for undefined customized data-handling scripts that are referred to in a received GraphQL SDL file. These templates define function names and parameters of the script, such that the script can be immediately called, before the script body has been defined, without generating errors. Subsequently, developer can insert scripting language instructions into the body of the script to achieve the desired data-handling functionality. As such, the auto-generation of templates substantially reduces development time and developer errors in creating these customized data-handling scripts. Additionally, it is recognized that the disclosed approach enables enhanced modularity and reuse of previously defined data types and data-handling scripts, which increases developer productivity and reduces errors during application development.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 illustrates a portion of an embodiment of a GraphQL SDL file that defines a GraphQL schema fragment, wherein the GraphQL SDL file includes annotations defining custom data-handling scripts of the GraphQL schema, in accordance with aspects of the present disclosure.

DETAILED DESCRIPTION

Figure 1:
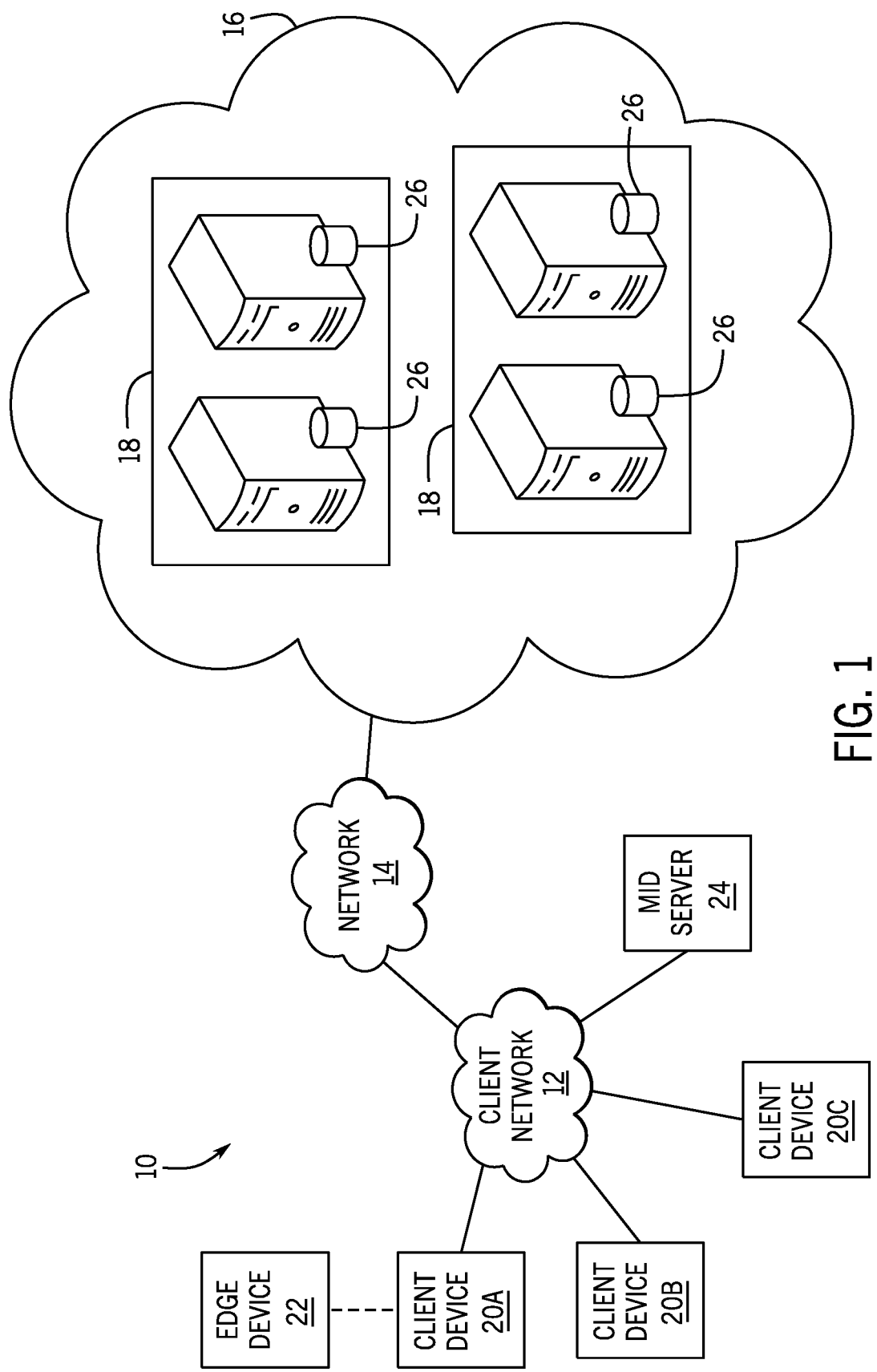
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Present embodiments are directed to a modified GraphQL server that enables application developers to define a custom GraphQL schema portion that is added to an overall GraphQL schema of a client instance "on the fly," without having to recompile code or wait for the next patch/upgrade of the client instance. For example, a developer may provide the disclosed GraphQL server with a GraphQL standard definition language (SDL) file that defines a portion of a GraphQL schema, including particular fields, data types, and so forth. Additionally, the GraphQL SDL file may include annotations that indicate that a customized data-handling script, such as a custom data-fetching script or a custom type resolver script, be called for handling certain data types or fields. Since these customized data-handling scripts are resolved and called at runtime based on the annotations in the GraphQL SDL file, each of these scripts can be customized and immediately implemented (e.g., "on the fly"). The GraphQL SDL file and the customized data-handling scripts may be stored in one or more suitable database tables, and the GraphQL server may be configured to regenerate the GraphQL schema in response to detecting a change in the data stored by these tables. Additionally, the customized data-handling scripts can be cached for enhanced efficiency, and the cache may be flushed and reloaded in response to changes to one or more of the database tables.

By enabling developers to define partial schemas in the GraphQL SDL language and implement GraphQL data-handling scripts in a suitable scripting language, GraphQL schema portability can be maintained across client instances, as well as instance release versions. Additionally, the disclosed GraphQL server enables auto-generation of templates or shells for customized data-handling scripts that are referred to in a received GraphQL SDL file. These templates define function names and parameters of the script, such that the script can be immediately called, before the script body has been defined, without generating error. Subsequently, developer can insert scripting language instructions into the body of the script to achieve the desired functionality. As such, the auto-generation of templates substantially reduces development time and developer errors in creating these customized data-handling scripts. Additionally, it is recognized that the disclosed approach enables enhanced modularity and reuse of previously defined data types and data-handling scripts, which increases developer productivity and reduces errors during application development.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
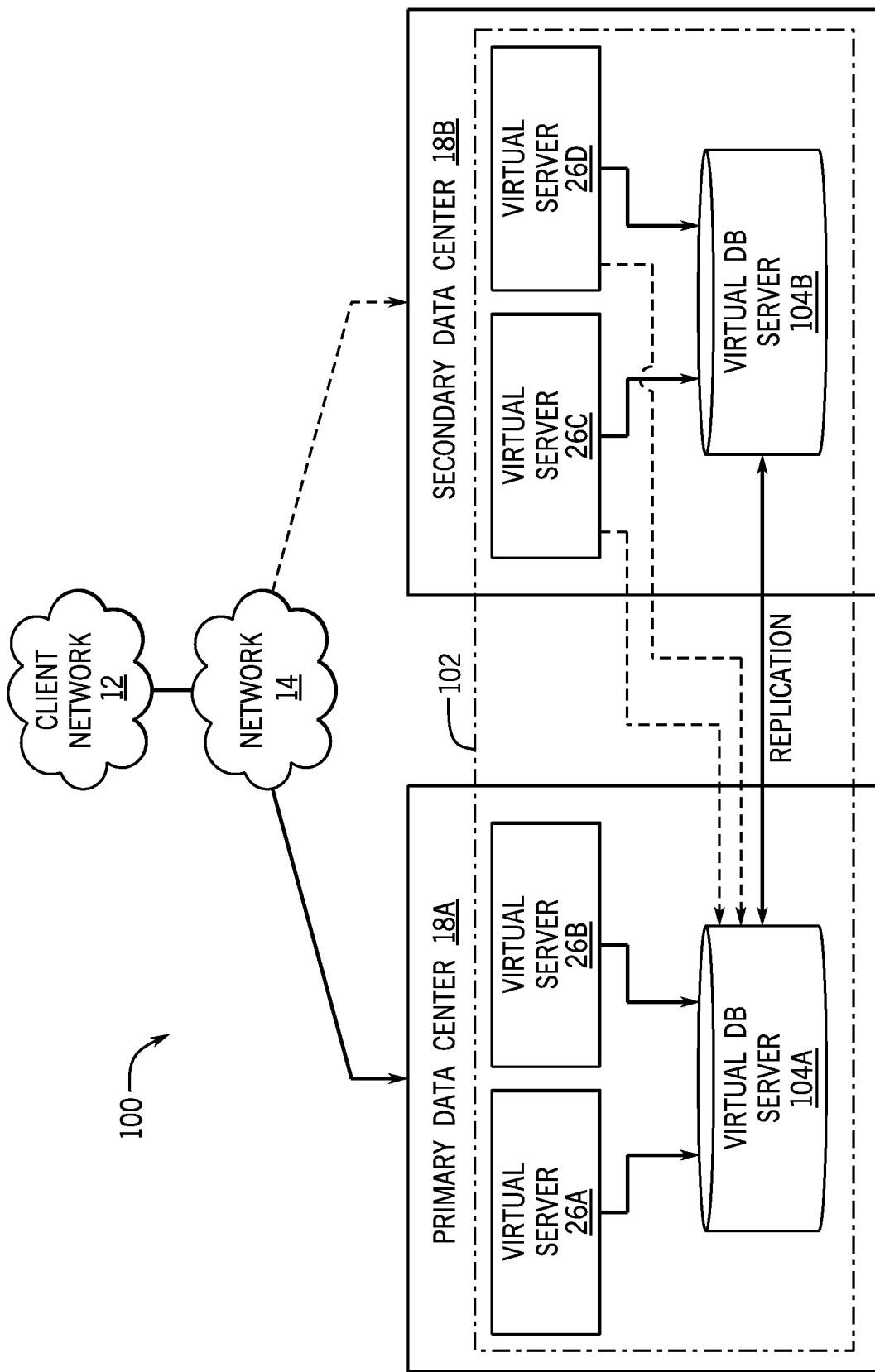
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
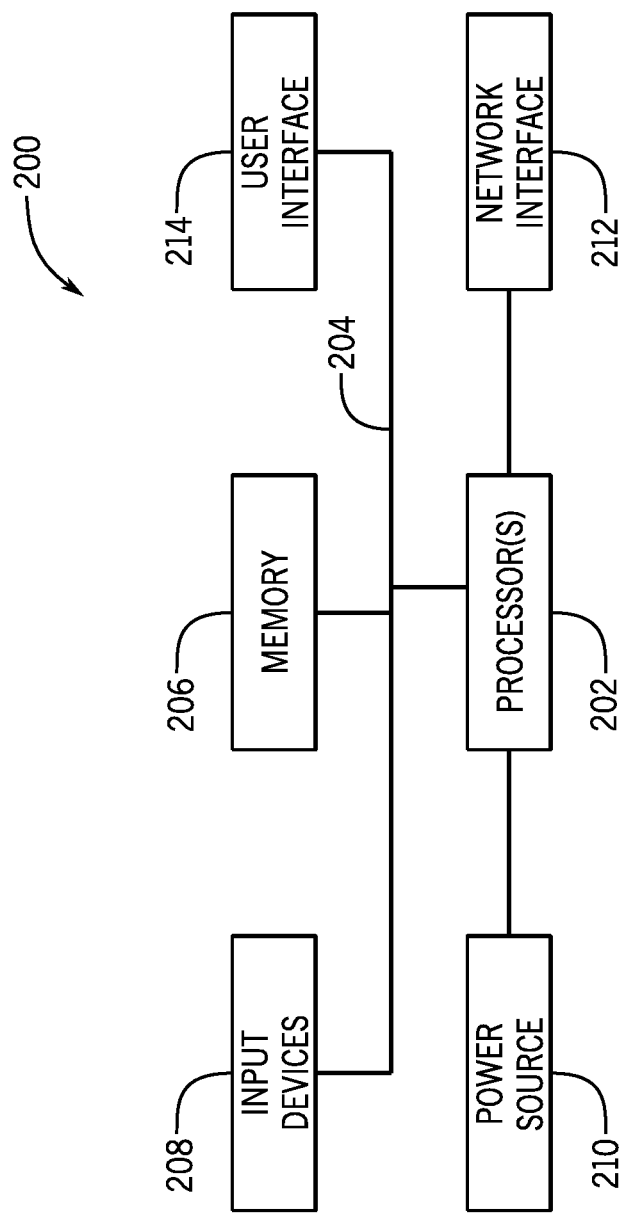
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
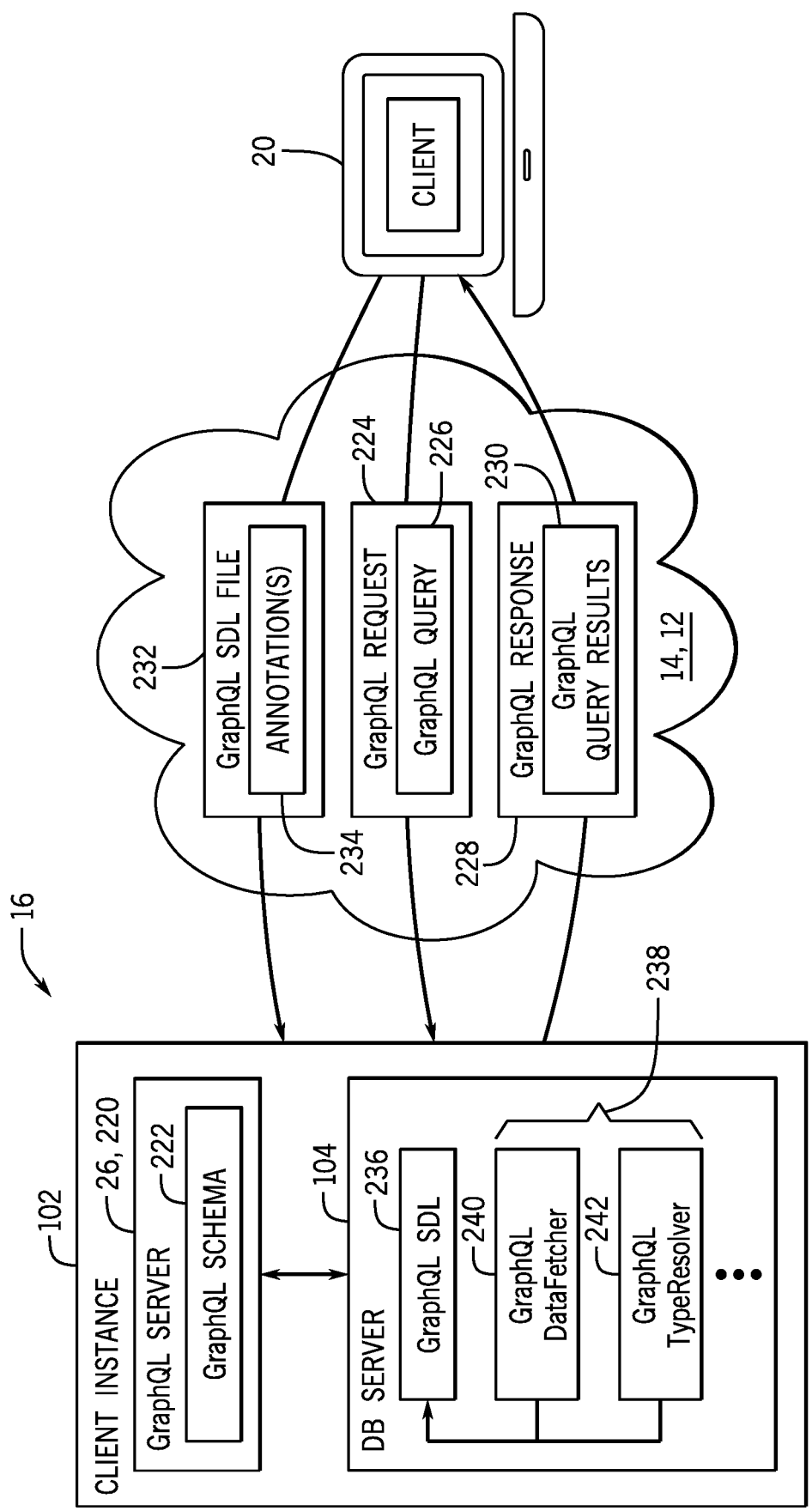
FIG. 4 is a block diagram illustrating an embodiment of a client instance that includes a modified GraphQL server communicatively coupled to a database server, in accordance with aspects of the present disclosure.

With the preceding in mind, FIG. 4 is a block diagram illustrating an embodiment in which a virtual server 26 and a database server 104 support and enable the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the networks 14 and 12 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

More specifically, the virtual server 26 of the illustrated client instance 102 includes a GraphQL server 220 that hosts a GraphQL schema 222 (also referred to herein as the "overall GraphQL schema" or the "global GraphQL schema") that describes data stored by the database server 104. The GraphQL server 220 is generally designed to receive a GraphQL request 224 that includes one or more GraphQL queries 226, and then to execute the received queries against the GraphQL schema 222 to retrieve data from the database server 104. In response to executing the received GraphQL query 226, the GraphQL server 220 is designed to generate a corresponding GraphQL response 228 that includes GraphQL query results 230, which are returned to the requesting device (e.g., client device 20). While the GraphQL request 224 is indicated as being received from the client device 20 for the illustrated embodiment, in other embodiments, the GraphQL request 224 may be received from an application hosted by another virtual server 26 of the client instance 102, from the GraphQL server 220 itself, or another suitable device.

Additionally, unlike a typical GraphQL server, the GraphQL server 220 of the embodiment illustrated in FIG. 4 is modified or customized to enable the receipt of a GraphQL standard definition language (SDL) file 232, which defines a partial GraphQL schema (also referred to herein as a "GraphQL schema fragment"). The GraphQL SDL file 232 defines the fields, data types, and so forth, for the partial GraphQL schema. The illustrated GraphQL SDL file 232 also includes annotations 234 (also referred to herein as "GraphQL directives") indicating or declaring that custom data-handling functions should be used for particular data (e.g., fields, data types, objects) of the GraphQL schema fragment. Additionally, the GraphQL server 220 is designed to implement the received GraphQL SDL file 232 and host the corresponding GraphQL schema fragment, for example, as part of the overall or global GraphQL schema 222. In certain embodiments, the GraphQL server 220 is generally designed to validate the received GraphQL SDL file 232, identify all of the annotations 234 of the GraphQL SDL file 232, and save the GraphQL SDL file 232 (e.g., a textual representation of the GraphQL SDL file 232) to a GraphQL SDL table 236 stored by the database server 104. Additionally, the GraphQL server 220 may be designed to compile the GraphQL SDL file 232 with other SDL files defining other portions of the overall GraphQL schema 222, and then generate and host the GraphQL schema fragment as part of the overall GraphQL schema 222 of the GraphQL server 220. For example, in certain embodiments, validation and separation of the schemas may be preserved by forcing each schema fragment to define and use a prefix for all GraphQL type names. For such embodiments, this prefix may then checked for uniqueness against all other partial schemas to avoid naming collisions. Additionally, it may be appreciated that the process of creating the global GraphQL schema enables mixing scripted GraphQL schemas with JAVA GraphQL schemas, in addition to dynamic GraphQL schemas.

Additionally, for the embodiment illustrated in FIG. 4, the database server 104 stores GraphQL data-handling script tables 238, including a respective table for each type of custom data-handling script. For the illustrated embodiment, the GraphQL data-handling script tables 238 include a GraphQL DataFetcher table 240 that is designed to store custom data-fetching scripts to retrieve and/or generate certain pieces of data within a GraphQL schema, as well as a GraphQL TypeResolver table 242 that is designed to store custom type-resolving scripts to determine the data type of fields of the GraphQL schema. It may be appreciated that the illustrated examples of GraphQL data-handling script tables 238 is not intended to be limiting. Indeed, custom data-handling scripts can be defined to analyze, retrieve, and/or generate data pertaining to, or defined by, the GraphQL schema 222. Additionally, in certain embodiments, the GraphQL SDL table 236 may be related to the various GraphQL data-handling scripts tables 238, for example, using primary-foreign key relationship for a relational database or a class relationship (e.g., USES:USED BY) for a class-based database. For such embodiments, a deletion of an entry from the GraphQL SDL table 236 will result in the automatic removal of related entries in the GraphQL data-handling scripts tables 238.

For the embodiment illustrated in FIG. 4, after identifying the annotations 234 of the received GraphQL SDL file 232, the GraphQL server 220 creates default templates in the appropriate GraphQL data-handling scripts tables 238 for each of the data-handling scripts referenced by the annotations 234 that is currently undefined. For example, when the received GraphQL SDL file 232 includes an annotation that indicates a custom data fetcher script named "phoneNumberFetcher" is to be used to retrieve data from a phone number field defined by the schema, and the "phoneNumberFetcher" has not been created in the GraphQL DataFetcher table 240, then the GraphQL server 220 responds by initially creating a record in the GraphQL DataFetcher table 240 that stores a template for the "phoneNumberFetcher" script. The template may be thought of as a "shell" for the "phoneNumberFetcher" script, in that it includes a valid script having the script name indicated by the corresponding annotation and having standardized inputs (e.g., parameters) and outputs. As such, after the templates for the data-handling scripts have been added to the GraphQL data-handling scripts tables 238, the scripts are valid scripts that can be immediately called without generating an error. Subsequently, a developer may add suitable instructions to the body of this data-handling script template to modify the "phoneNumberFetcher" data fetcher script to have the desired customized functionality.

Figure 5:
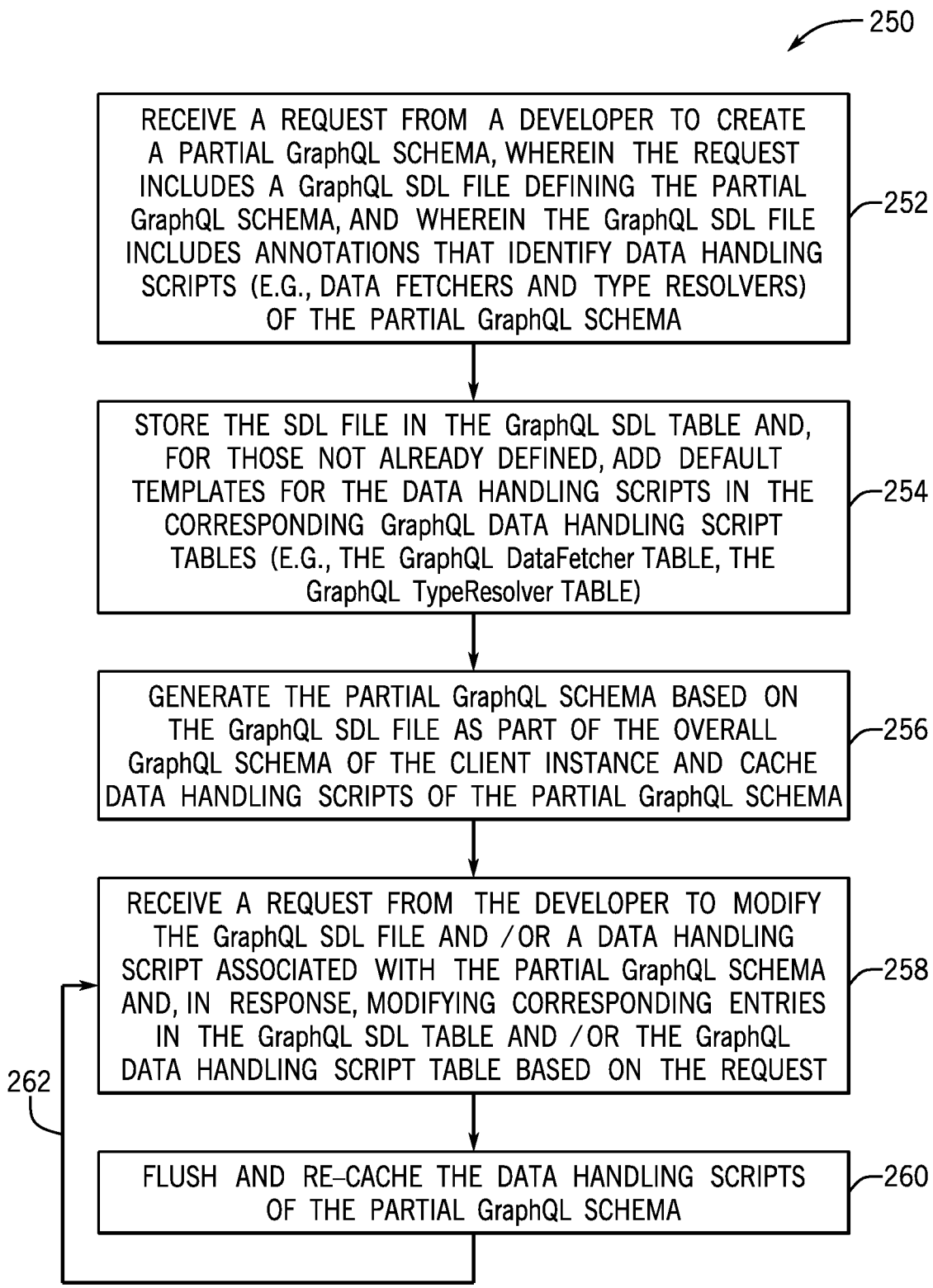
FIG. 5 is a flow diagram illustrating an embodiment of a process by which the GraphQL server may create a new GraphQL schema fragment having customized data-handling scripts, in accordance with aspects of the present disclosure.

FIG. 5 is a flow diagram illustrating an embodiment of a process 250 by which the GraphQL server 220 may create a new GraphQL schema fragment having customized data-handling scripts. As such, the process 250 may be stored as computer-executable instructions in a suitable memory (e.g., memory 206) and executed by a suitable processor (e.g., processor 202) associated with a virtual server 26 of the client instance 102 hosting the GraphQL server 220. It may be appreciated that the process 250 is provided as an example, and in other embodiments, the process 250 may include repeated steps, additional steps, or fewer steps that those illustrated in FIG. 5, in accordance with the present disclosure. FIG. 5 is discussed with reference to elements illustrated in FIG. 4.

For the illustrated embodiment, the process 250 begins with the GraphQL server 220 receiving (block 252) a request from a developer to create a new partial GraphQL schema. The request includes a GraphQL SDL file 232 that defines the GraphQL schema fragment, such as the fields, data types, and so forth, for the new schema fragment. Additionally, as discussed below with respect to FIG. 6, the GraphQL SDL file 232 includes annotations that identify data-handling scripts, such as data fetchers and type resolvers, for the GraphQL schema fragment. Additionally, as mentioned, in certain embodiments, the GraphQL server 220 may validate the received GraphQL SDL file 232 before proceeding.

Continuing through the embodiment of the process 250 illustrated in FIG. 5, in response to receiving the developer request in block 252, the GraphQL server 220 stores (block 254) the GraphQL SDL file 232 in the GraphQL SDL table 236 in a suitable format (e.g., as an indexable, searchable textual representation). In block 254, the GraphQL server 220 analyzes the SDL file 232 for SDL syntax errors, and if detected, the GraphQL server 220 will not proceed through the remainder of the process. The GraphQL server 220 also analyzes the received GraphQL SDL file 232 to identify annotations 234 indicating a particular data-handling script should be dynamically resolved and executed when a particular field of the partial GraphQL schema is referenced. Additionally, for annotations 234 that reference data-handling scripts that are not already defined within the data-handling script tables 238, the GraphQL server 220 creates default templates or shells for the data-handling scripts in the corresponding data-handling script tables 238 based on the annotations 234 of the received GraphQL SDL file 232. For example, based on the GraphQL SDL file 232, the GraphQL server 220 may add a default data-fetching script template to the GraphQL DataFetcher table 240 and add a default type-resolving script template to the GraphQL TypeResolver table 242. It may be appreciated that the default templates of the data-handling scripts include the data-handling function names defined by the annotations of the received SDL file, and also include input(s) (e.g., parameters) expected to be received by, as well as output(s) expected to be provided by, each data-handling script. As such, the default templates limit developer difficulty and errors in customizing the data-handling scripts, as discussed herein.

Continuing through the embodiment of the process 250 illustrated in FIG. 5, after storing the GraphQL SDL file 232 and creating the default templates for the data-handling scripts in block 254, the GraphQL server 220 generates (block 256) the partial GraphQL schema based on the GraphQL SDL file 232. For example, in certain embodiments, the GraphQL server 220 may compile the partial GraphQL schema into the overall GraphQL schema 222 of the client instance 102. When the partial GraphQL schema is compiled into the global GraphQL schema, it may be appreciated that the standard GraphQL data fetchers, as well as standard GraphQL type resolvers, for annotated schema fields are replaced with calls to dynamically execute the custom data-handling scripts indicated by the annotations. In other words, every field of the compiled GraphQL schema is assigned a suitable data fetcher, and every type that involves a type resolver is assigned a suitable type resolver, wherein the data fetcher or type resolver is either a GraphQL standard function or is a custom data-handling script defined by the annotations in the corresponding GraphQL SDL file 232. Additionally, in certain embodiments, upon generating the partial GraphQL schema, the GraphQL server 220 also caches the data-handling scripts of the GraphQL schema for enhanced performance.

Continuing through the embodiment of the process 250 illustrated in FIG. 5, after generating the partial GraphQL schema, the GraphQL server 220 may subsequently receive (block 258) a request from the developer to modify or customize the GraphQL SDL file 232 and/or the one or more of the data-handling scripts associated with the partial GraphQL schema. In response, the GraphQL server 220 modifies the stored GraphQL SDL file 232 and/or the stored data-handling scripts based on the developer request. For example, the GraphQL server 220 may receive a developer request that includes additional or modified instructions for a data-fetching script of the GraphQL schema fragment, and in response, may update the data-fetching script in the GraphQL DataFetcher table 240. Accordingly, when the field of the partial GraphQL schema associated with the customized data-fetching script is later accessed, the GraphQL server 220 may, at runtime, resolve the identity of the customized data-fetching script, access the script from the cache, and then execute the script, as discussed below with respect to FIG. 7.

Continuing through the embodiment of the process 250 illustrated in FIG. 5, after modifying the stored GraphQL SDL file and/or data-handling scripts in block 258, the GraphQL server 220 flushes and re-caches (block 260) the data-handling scripts associated with the partial GraphQL schema. Indeed, in certain embodiments, in response to detecting a modification of a data-handling script stored in a data-handling script tables 238 (e.g., the GraphQL DataFetcher table 240, the GraphQL TypeResolver table 242), the GraphQL server 220 is designed to automatically flush the cache and reload the data-handling functions from the corresponding data-handling script tables 238, as indicated by the arrow 262. Additionally, as noted above, in addition to reloading the partial GraphQL schema, the GraphQL server 220 may also flush and reload the cached data-handling scripts in response to detecting a change in the corresponding GraphQL SDL file 232. In this manner, the GraphQL server 220 ensures the most up-to-date versions of the data-handling scripts are available to be located and executed from the cache.

FIG. 6 illustrates a portion of an embodiment of a GraphQL SDL file 232 that defines a GraphQL schema fragment 270, wherein the GraphQL SDL file 232 includes annotations 234 defining data-handling scripts of the schema fragment. The illustrated GraphQL SDL file 232 is provided as an example, and in other embodiments, the GraphQL SDL file 232 may include different features, in accordance with the present disclosure. For the example embodiment of the GraphQL SDL file 232 illustrated in FIG. 6, a "GlideMovie_QueryType" data type is defined to include a "hero" object. The "hero" object includes a "name" field that stores a string value, and the "hero" object implements a "Character" interface. The illustrated portion of the GraphQL SDL file 232 also defines the "Character" interface as including an "id" field that stores an identifier and a "name" field that stores a string value. The illustrated portion of the GraphQL SDL file 232 also defines two additional data types, a "Human" data type and a "Robot" data, both of which include an "id" field that stores an identifier and a "name" field that stores a string value.

For the illustrated portion of the example GraphQL SDL file 232, the "hero" object includes the annotation 234A, which indicates that the "hero" object will be retrieved or generated by a custom "heroFetcher" data-handling script stored in the GraphQL DataFetcher table 240. For this example, the customized "heroFetcher" data-handling script may analyze or compare a value of the "name" field with a known value or range of values and only return data for characters that are known to be heroes, as opposed to villains or neutral characters. Additionally, the "Character" interface includes the annotation 234B, which indicates that any calls to resolve the type of an object that implements the "Character" interface will be performed by a custom "characterTypeResolver" data-handling script stored in the GraphQL TypeResolver table 242. For example, the customized "characterTypeResolver" data-handling script may analyze or compare a value of the "id" field or "name" field with a known value or range of values to determine whether the data type of an object that implements the "Character" class is a particular type of character is of the "Human" data type or the "Robot" data type. Since, in this example, both the "Human" and "Robot" data types implement the "Character" interface, any calls to resolve the type of an object of the "Human" or "Robot" data types will be performed by this custom "characterTypeResolver" data-handling script. Additionally, while the "name" field of objects of the "Robot" data type are returned via the standard GraphQL data-fetching mechanisms, the "name" field of the "Human" data type includes the annotation 234C, which indicates that the "name" field of objects having the "Human" data type will be retrieved or generated by a custom "humanNameFetcher" data-handling script stored in the GraphQL DataFetcher table 240. For this example, the customized "humanNameFetcher" data-handling script may massage or modify the string stored by the "name" field of an object of the "Human" data type before the value is returned, for example, to modify the string from a first format (e.g., "LAST, FIRST") to a second format (e.g., "FIRST LAST").

Figure 7:
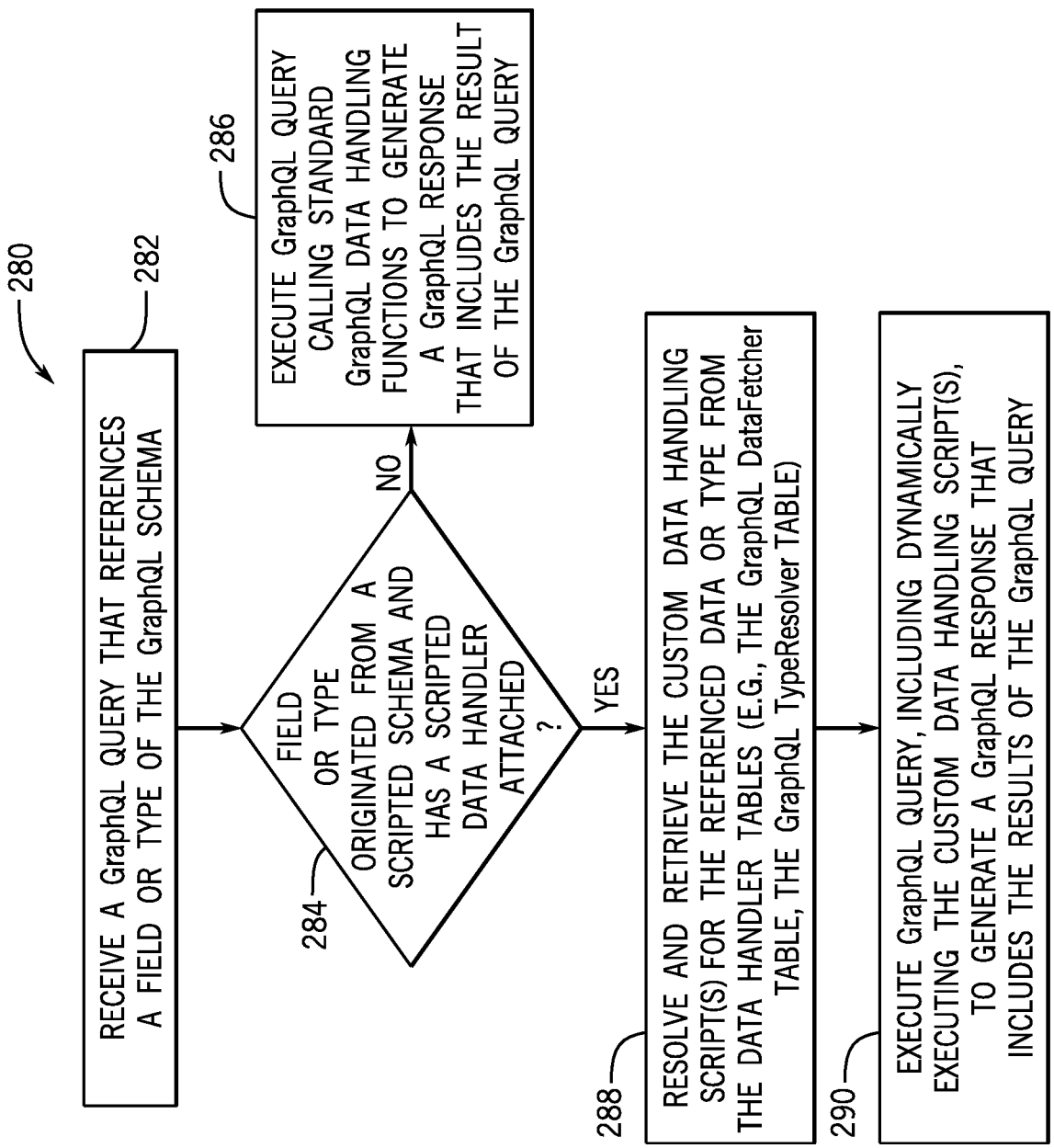
FIG. 7 is a flow diagram illustrating an embodiment of a process by which the GraphQL server uses customized data-handling scripts to fulfill GraphQL queries.

FIG. 7 is a flow diagram illustrating an embodiment of a process 280 by which the GraphQL server 220 uses the disclosed customized data-handling scripts to fulfill GraphQL queries 226. As such, the process 280 may be stored as computer-executable instructions in a suitable memory (e.g., memory 206) and executed by a suitable processor (e.g., processor 202) associated with a virtual server 26 of the client instance 102 hosting the GraphQL server 220. It may be appreciated that the process 280 is provided as an example, and in other embodiments, the process 280 may include repeated steps, additional steps, or fewer steps that those illustrated in FIG. 7, in accordance with the present disclosure. It should be appreciated that the process 280 can be used to fulfill GraphQL queries involving the execution of any suitable number of customized data-handling scripts (e.g., data-fetching scripts, type resolver scripts, etc.). FIG. 7 is discussed with reference to elements illustrated in FIG. 4.

The illustrated process 280 begins with the GraphQL server 220 receiving (block 282) a GraphQL query 226 that references (e.g., requests, modifies, or requests information regarding) a field or type of a global GraphQL schema 222, as partially defined by the GraphQL SDL file 232 illustrated in FIG. 6. The GraphQL query 226 can be received from a number of different sources. For example, the GraphQL query 226 may be received from a client device 20, may be received from an application hosted by the client instance 102, or may be received from (or triggered by) the GraphQL server 220 itself as part of the execution of a different GraphQL query.

For the embodiment illustrated in FIG. 7, in response to receiving the GraphQL query 226 in block 282, the GraphQL server 220 parses and analyzes the received GraphQL query to determine (block 284) whether the referenced field or type originated from a scripted GraphQL schema or is associated with a custom data-handling script. That is, as set forth above, when the GraphQL schema is built or compiled, each field and type is assigned a suitable data-handling function. As discussed, for annotated schema fields and types, the standard GraphQL data fetchers, as well as standard GraphQL type resolvers, are replaced with calls to dynamically execute the custom data-handling scripts indicated by the annotations in the corresponding GraphQL SDL file. When the GraphQL server 220 determines that the referenced field or type did not originate from a scripted GraphQL schema or is not associated with a custom data-handling script, then the GraphQL server 220 may respond by executing (block 286) the GraphQL query 226 using calls to standard GraphQL data-handling functions to generate a GraphQL response that includes the results of the GraphQL query. The GraphQL response 228, including the GraphQL query results 230, is then provided to the requester of the GraphQL query 226, as discussed above with respect to FIG. 4.

For the embodiment illustrated in FIG. 7, when the GraphQL server 220 determines that the referenced field or type originated from a scripted GraphQL schema or is associated with a custom data-handling script, the GraphQL server 220 responds by resolving and retrieving (block 288) the custom data-handling scripts for the referenced field or type from the corresponding GraphQL data-handling tables 238. In other words, after dynamically resolving the particular data-handling scripts from global GraphQL schema, the GraphQL server 220 retrieves these custom data-handling scripts for eventual dynamic execution as part of the GraphQL query execution. For example, the GraphQL server 220 may retrieve custom data fetcher scripts from the GraphQL DataFetcher table 240, as well as custom type resolver scripts from the GraphQL TypeResolver table 242, that are associated with the referenced field or type. As noted above, in certain embodiments, the GraphQL server 220 may retrieve the custom data-handling scripts from cached versions of the GraphQL data-handling tables 238 for enhanced performance. For example, in certain embodiments, the GraphQL server 220 may retrieve interpretable computer-implemented instructions for the custom data-handling scripts in the form of JAVASCRIPT, or another suitable scripting language.

For the illustrated embodiment, the process 280 concludes with the GraphQL server 220 executing (block 290) the GraphQL query 226, including dynamically executing (e.g., dynamically evaluating at runtime) the custom data-handling scripts, and generating a GraphQL response 228 that includes the GraphQL query results 230. For example, when executing the GraphQL query 226, the GraphQL server 220 may make calls using a suitable class or function (e.g., a GlideScopedEvaluator class) that is designed to dynamically interpret and perform, at runtime, the instructions of the custom data-handling script to analyze, retrieve, and/or generate the referenced field or type. In other words, the GraphQL server 220 may use calls to a runtime script interpreter to execute the appropriate data-handling scripts to retrieve or generate the information associated with each annotated field or type of the GraphQL SDL file 232. As such, the GraphQL server 220 may be described as dynamically executing the data-handling scripts to retrieve the desired information during execution of the GraphQL query 226. The GraphQL response 228, including the GraphQL query results 230, is then provided to the requester of the GraphQL query 226, as discussed above with respect to FIG. 4.

It is also presently recognized that the disclosed approach provides enhanced modularity, which enables developers to reuse and build on top of previously defined data types and their corresponding customized data-handling scripts. To illustrate this advantage, Example 1 below is a portion of an embodiment of a GraphQL SDL file 232 in which a developer defines a new schema fragment named "MyQuickUserLookupSchemaType". The schema fragment includes a field named "allUsersOnVacationWhoNeedToGetPaid." However, rather than defining the field type explicitly with additional instructions, the developer instead defines the field to have a type, "UserListObjectType" that has been previously defined in another portion of the overall GraphQL schema 222. Along with this type, the developer includes suitable annotations that indicate that this type should be retrieved using a previously defined, customized data-handling script, "UserDataFetchingScript." As such, the developer is able to build on top of this existing data type, and the corresponding data-handling script, without having to be concerned about, or even aware of, the nuances of defining the data type or the data-handling process anew. It may be appreciated that this enhances productivity and reduces mistakes during application development.

Example 1

```
type MyQuickUserLookupSchemaType{
allUsersOnVacationWhoNeedToGetPaid :
     UserListObjectType @DataFetcher (id: "UserDataFetchingScript")
}
```

The technical effects of the present disclosure include a modified GraphQL server that enables application developers to define a custom GraphQL schema fragment that is added to an overall GraphQL schema of a client instance "on the fly," without having to recompile code or wait for the next patch/upgrade of the client instance. For example, a developer may provide the disclosed GraphQL server with a GraphQL standard definition language (SDL) file having annotations that indicate that a customized data-handling script, such as a custom data-fetching script or a custom type resolver script, be called for handling certain data types or fields. Since these customized data-handling scripts are resolved and called at runtime based on the annotations in the GraphQL SDL file, each of these scripts can be customized and immediately implemented (e.g., "on the fly"). By enabling developers to define partial schemas in the GraphQL SDL language and implement GraphQL data-handling scripts in a suitable scripting language, GraphQL schema portability can be maintained across client instances, as well as instance release versions. Additionally, the disclosed GraphQL server enables auto-generation of templates or shells for customized data-handling scripts, which substantially reduces development time and developer errors in creating these customized data-handling scripts. Additionally, it is recognized that the disclosed approach enables enhanced modularity and reuse of previously defined data types and data-handling scripts, which increases developer productivity and reduces errors during application development.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a GraphQL server comprising a processor and a memory, wherein the GraphQL server is configured to perform actions comprising:
generating a partial GraphQL schema from a GraphQL standard definition language (SDLP) file, wherein the GraphQL SDL file includes an annotation indicating that a particular data-handling script is dynamically resolved and executed when a particular field or a particular type of the partial GraphQL schema is referenced;
receiving a GraphQL query that references the particular field or the particular type of the partial GraphQL schema;
executing the GraphQL query to generate GraphQL results, wherein executing the GraphQL query comprises dynamically resolving the particular data-handling script based on the annotation in the GraphQL SDL file and dynamically executing the particular data-handling script to retrieve information associated with the particular field or the particular type; and
providing the GraphQL results in response to the GraphQL query.

2. The system of claim 1, wherein, to dynamically execute the particular data-handling script, the GraphQL server is configured to perform actions comprising:
calling a runtime interpreter that dynamically evaluates the particular data-handling script to retrieve the information associated with the particular field or the particular type during execution of the GraphQL query.

3. The system of claim 1, wherein, to generate the partial GraphQL schema, the GraphQL server is configured to perform actions comprising:
analyzing the GraphQL SDL file to identify the annotation; and
in response to determining that the particular data-handling script has not been defined, creating a template for the particular data-handling script indicated by the annotation.

4. The system of claim 1, wherein the GraphQL SDL file includes a second annotation indicating that a second particular data-handling script is dynamically resolved and executed when a second particular field or a second particular type of the partial GraphQL schema is referenced, and wherein, to execute the GraphQL query, the GraphQL server is configured to perform actions comprising:
    dynamically resolving the second particular data-handling script based on the second annotation in the GraphQL SDL file; and
    dynamically executing the second particular data-handling script to retrieve information associated with the second particular field or the second particular type.

5. The system of claim 4, wherein, to generate the partial GraphQL schema, the GraphQL server is configured to perform actions comprising:
    analyzing the GraphQL SDL file to identify the second annotation; and
    in response to determining that the second particular data-handling script has not been defined, creating a second template for the second particular data-handling script indicated by the second annotation, wherein the particular data-handling script is a data fetcher script and the second particular data-handling script is a type resolver script.

6. The system of claim 1, wherein, after generating the partial GraphQL schema, the GraphQL server is configured to perform actions comprising:
    caching the particular data-handling script;
    receiving a request to modify the GraphQL SDL file or the particular data-handling script; and
    in response to receiving the request, modifying the GraphQL SDL file or the particular data-handling script and then flushing and re-caching the particular data-handling script.

7. The system of claim 1, wherein the system comprises a database server communicatively coupled to the GraphQL server and configured to store a standard definition language (SDL) table and a data-handling script table, and wherein, to generate the partial GraphQL schema, the GraphQL server is configured to perform actions comprising:
    receiving and storing the GraphQL SDL file in the SDL table; and
    in response to determining that the particular data-handling script has not been defined in the data-handling script table, creating a template for the particular data-handling script indicated by the annotation in the data-handling script table.

8. The system of claim 1, wherein, to generate the partial GraphQL schema, the GraphQL server is configured to perform actions comprising:
    compiling the GraphQL SDL file into a plurality of SDL files defining an overall GraphQL schema of the GraphQL server; and
    generating the overall GraphQL schema that includes the partial GraphQL schema.

9. A method of operating a GraphQL server, comprising:
    generating a partial GraphQL schema from a GraphQL standard definition language (SDLP) file, wherein the GraphQL SDL file includes an annotation indicating a particular data-handling script for a particular field or a particular type of the partial GraphQL schema;
    receiving a GraphQL query that references the particular field or the particular type of the partial GraphQL schema;
    executing the GraphQL query to generate GraphQL results, wherein executing the GraphQL query comprises dynamically resolving the particular data-handling script based on the annotation in the GraphQL SDL file and dynamically executing the particular data-handling script to retrieve information associated with the particular field or the particular type; and
    providing the GraphQL results in response to the GraphQL query.

10. The method of claim 9, wherein, before generating the partial GraphQL schema, the method comprises:
    receiving the GraphQL SDL file from a communicatively coupled client device; and
    storing the GraphQL SDL file in a first table of a database server that is communicatively coupled to the GraphQL server.

11. The method of claim 10, wherein generating the partial GraphQL schema comprises:
    in response to determining that the particular data-handling script has not been defined in a second table of the database server, creating a template for the particular data-handling script indicated by the annotation in the second table.

12. The method of claim 9, wherein, after generating the partial GraphQL schema and before receiving the GraphQL query, the method comprises:
    caching the particular data-handling script; and
    in response to a determining that the GraphQL SDL file or the particular data-handling script has been modified, flushing and re-caching the particular data-handling script.

13. The method of claim 9, wherein dynamically executing the particular data-handling script comprises:
    calling a runtime interpreter that dynamically evaluates the particular data-handling script to retrieve the information associated with the particular field or the particular type during execution of the GraphQL query.

14. The method of claim 9, wherein the GraphQL SDL file includes a second annotation indicating that a second particular data-handling script is dynamically resolved and executed when a second particular field or a second particular type of the partial GraphQL schema is referenced, and wherein, to generate the partial GraphQL schema, the GraphQL server is configured to perform actions comprising:
    analyzing the GraphQL SDL file to identify the second annotation; and
    in response to determining that the second particular data-handling script has not been defined, creating a second template for the second particular data-handling script indicated by the second annotation.

15. The method of claim 14, wherein the particular data-handling script is a type resolver script and the second particular data-handling script is a data fetcher script.

16. The method of claim 14, wherein executing the GraphQL query comprises:
    dynamically resolving the second particular data-handling script based on the second annotation in the GraphQL SDL file and dynamically executing the second particular data-handling script to retrieve information associated with the second particular field or the second particular type during execution of the GraphQL query.

17. The method of claim 9, wherein generating the partial GraphQL schema comprises:
    compiling the GraphQL SDL file into a plurality of SDL files defining an overall GraphQL schema; and
    generating the overall GraphQL schema that includes the partial GraphQL schema.

18. One or more non-transitory, computer-readable media at least collectively storing instructions executable by a processor of a GraphQL server, wherein the instructions comprise instructions to:
    generate a partial GraphQL schema from a GraphQL standard definition language (SDL) file that includes an annotation that corresponds to a particular field or a particular type of the partial GraphQL schema;

receive a GraphQL query that references the particular field or the particular type of the partial GraphQL schema;

execute the GraphQL query to generate GraphQL results, wherein executing the GraphQL query comprises dynamically resolving a particular data-handling script based on the annotation in the GraphQL SDL file and dynamically executing the particular data-handling script to retrieve information associated with the particular field or the particular type of the partial GraphQL schema; and provide the GraphQL results in response to the GraphQL query.

19. The media of claim 18, wherein the instructions comprise instructions to:

after generating the partial GraphQL schema, cache the particular data-handling script; and in response to determining that the GraphQL SDL file or the particular data-handling script has been modified, flush and re-cache the particular data-handling script.

20. The media of claim 18, wherein the instructions to dynamically execute the particular data-handling script comprise instructions to:

call a runtime interpreter that dynamically evaluates the particular data-handling script to retrieve the information associated with the particular field or the particular type during execution of the GraphQL query.

\* \* \* \* \*

UNITED STATES PATENT AND TRADEMARK OFFICE
CERTIFICATE OF CORRECTION

| | | |
|---|---|---|
| PATENT NO. | : 11,720,532 B2 | |
| APPLICATION NO. | : 17/457867 | |
| DATED | : August 8, 2023 | |
| INVENTOR(S) | : David Tamjidi and Stuart Dean Swope | |

It is certified that error appears in the above-identified patent and that said Letters Patent is hereby corrected as shown below:

In the Claims

Column 16, Claim 1, Line 30, replace "(SDLP)" with --(SDL)--.

Column 17, Claim 9, Line 54, replace "(SDLP)" with --(SDL)--.

Signed and Sealed this
Fourteenth Day of November, 2023

Katherine Kelly Vidal
*Director of the United States Patent and Trademark Office*